United States Patent

[11] 3,597,008

[72] Inventor Edward J. Falk
 St. Louis, Mo.
[21] Appl. No. 863,139
[22] Filed Oct. 2, 1969
[45] Patented Aug. 3, 1971
[73] Assignee Wagner Electric Corporation
 Newark, N.J.

[54] CONTROL VALVE
 15 Claims, 3 Drawing Figs.
[52] U.S. Cl. ................................................. 303/6 C,
 60/54.5 E, 188/151 A, 188/349, 200/82 D, 303/84 A
[51] Int. Cl. ..................................................... B60t 8/26,
 B60t 11/34, B60t 17/22
[50] Field of Search............................................. 303/6, 6 C,
 22, 22 A, 84, 84 A; 60/54.5; 188/151, 151.11, 152,
 152.02, 152.11; 200/82, 87.3; 137/110

[56] References Cited
 UNITED STATES PATENTS
3,464,741 9/1969 Falk ............................... 303/6
3,467,440 9/1969 Strien............................ 303/6
3,472,559 10/1969 Bueler........................... 303/6
3,498,681 3/1970 Bueler........................... 303/6

Primary Examiner—Milton Buchler
Assistant Examiner—John J. McLaughlin
Attorney—Joseph E. Papin ABSTRACT: A control valve for use in a dual or split brake system having a switch-operating piston movable from a centered position toward opposed translated positions in response to a predetermined differential between separately supplied pressures acting thereon, and a metering piston movable to effect a metered application through said control valve of one of the supplied fluid pressures. The switch-operating piston and metering piston define a bypass passage subjected to the applied fluid pressure and isolated from the one supplied fluid pressure when the switch-operating piston is in its centered position, said bypass passage being subjected to the one supplied fluid pressure upon the movement of the switch-operating piston to one of its translated positions in order to obviate the metering actuation of the metering piston.

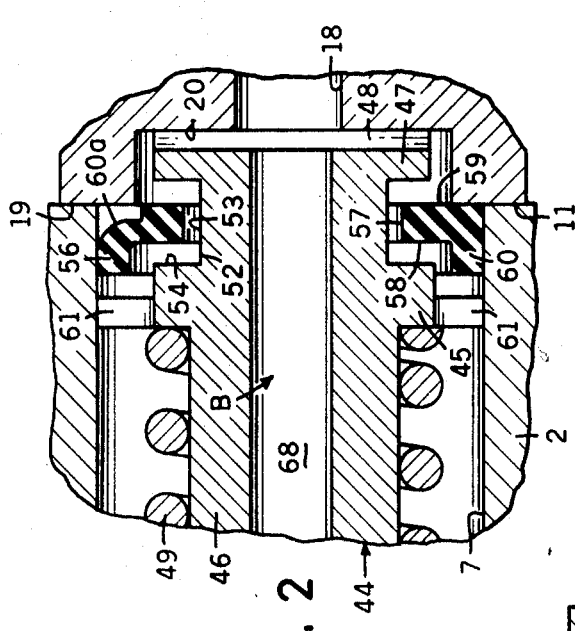

CONTROL VALVE

This invention relates to dual fluid pressure systems in general and in particular to control valves for controlling pressure fluid flow through one of said systems.

In the past, control valves, such as a combination-type driver-warning and proportioning valve, were utilized in a dual or split braking system having a switch-operating piston therein for energizing a driver warning or dash lamp in the event of a fluid pressure failure in one of the split systems and also having a proportioning or metering piston therein for proportioning the fluid pressure applied to the split system connected with the vehicle rear brakes. Such combination-type valves were also provided with a bypass feature or construction which bypassed fluid pressure around the proportioning piston to obviate the proportioning function thereof in the event of a fluid pressure failure in the split system connected with the vehicle front brakes in order to utilize the maximum available fluid pressure for braking during such an emergency condition; however, one of the disadvantageous features of such past combination valves was that the inherent operating characteristics of the switch-operating piston and proportioning piston were separately utilized to effect the bypass function of said combination valve and also special passage means was provided in the housing of said combination-type valve to accommodate such bypass function.

The primary object of the present invention is to provide a control valve which overcomes the aforementioned disadvantageous or undesirable features, and this, as well as other objects and advantageous features of the present invention, will become apparent hereinafter.

Briefly, the present invention comprises a control valve having a housing, means movable in said housing from a normally centered position toward opposed translated positions in response to a predetermined differential between separate fluid pressures supplied to said housing, other means for effecting a metered application through said housing of one of the supplied fluid pressures, and bypass passage means in said first-named and other means for connecting the one supplied and applied fluid pressures in open pressure fluid communication to obviate metering actuation of said other means upon the movement of said first named means to one of its translated positions.

In the drawings wherein like numerals refer to like parts wherever they occur:

FIG. 1 is a sectional view showing a control valve embodying the present invention in cross section;

FIG. 2 is an enlarged fragmentary view taken from FIG. 1; and

FIG. 3 is a graphical representation illustrating the output or applied fluid pressure effected by the control valve of FIG. 1 in response to the input or supplied fluid pressure.

Referring now to the drawings and in particular to FIG. 1, a control valve, indicated generally at 1, is provided with a housing 2 having a bore 3 therein in axial alignment with stepped counterbores 4, 5, 6, 7 and 8, and abutment shoulders 9, 10 and 11 are defined on said housing between said counterbores 4, 5 and 6, 7 and 8, respectively. A cross bore 12 is also provided in the housing 2 having one end intersecting the counterbore 4 while the other end thereof connects with a threaded cross counterbore 13 which is provided to receive an electrical switch, indicated generally at 14, to be discussed hereinafter. Inlet or supply ports 15, 16, adapted for connection with a dual or split system master cylinder (not shown) of a type well known to the art, are provided in the housing 2 respectively intersecting with the bore and counterbore 3, 6, and a closure member or end plug 17 is threadedly received in the counterbore 8 having an outlet port 18 provided therethrough for connection with one of the vehicle front and rear brake sets (not shown). The interior end of the closure member 17 defines an abutment or seat 19, and a recess 20 is provided in said closure member between said abutment and outlet port 18.

A centering piston, indicated generally at 21, is slidably received in the counterbore 5 having opposed ends or abutment surfaces 22, 23, and an axially extending bore 24 is provided through said centering piston between said opposed ends thereof. An O-ring seal 25 is sealably engaged between the counterbore 5 and the rightward end 23 of the centering piston 21, and the leftward opposed end 22 thereof is normally engaged with the housing shoulder 9, said O-ring and rightward end of said centering piston defining an angular effective area $A_1$ subjected to the fluid pressure at the inlet port 16 at all times.

A reciprocal switch actuating member or piston, indicated generally at 26, is shown in its centered or normal position in the housing 2 having spaced, opposed, annular extensions or end portions 27, 28 thereon. The switch piston flange 27 is slidably received in the housing bore 3, and a peripheral seal 29 is carried on said flange in sealing engagement with said housing bore. The sealing engagement of the seal 29 with the bore 3 defines an effective cross-sectional area $A_2$ on the flange 27 which is subjected to the fluid pressure at the inlet port 15 at all times, and an inlet chamber 30 is defined in said bore between the leftward end wall thereof and the switch piston flange 27 in open pressure fluid communication with said inlet port. The switch piston flange 28 is slidably received in the centering piston bore 24 and extends through the O-ring seal 25 in sealing engagement therewith, and said switch piston flange also extends coaxially through the housing counterbore 5 having a free end 31 thereon in the housing counterbore 6. An axially extending bore 32 is provided in the switch piston flange 28 having one end intersecting with the free end 31, and a venting or damping passage 33 is connected in open communication between the other end of said bore and the housing counterbore 4. Another annular effective area $A_3$ is defined on the switch piston flange 28 between the peripheral portion thereof in sealing engagement with the O-ring seal 25 and the piston bore 32, said area $A_3$ being subjected to the fluid pressure at the inlet port 16 at all times. It should be noted that the area $A_3$ is opposed to and less than the area $A_2$, and that the area $A_1$ is additive to and greater than the area $A_3$; however, the sum of the areas $A_1$, $A_3$ is greater than the area $A_2$.

The switch piston 26 is also provided with a switch-positioning portion or land 34 which is positioned beneath the housing cross bore 12 when said switch piston is in its centered position (as shown) and peripheral cam faces or surfaces 35, 36 are also provided on said switch piston on opposite sides of said land, said cam face 36 also defining an abutment for driving engagement with the leftward end 22 of the centering piston 22. The switch 14, as previously mentioned, includes a nonconductive closure or plug member 37 threadedly received in the housing cross counterbore 13, and a metal terminal 38 extends through said plug member being insulated therefrom, said terminal having an exterior end for connection in an electrical circuit of a type well known in the art for selectively energizing a driver warning or dash lamp (not shown). A nonconductive switch member 39 is slidably received in the housing cross bore 12 having a lower or follower end 40 movable therethrough into the housing counterbore 4 for engagement with the switch piston land 34 and cam faces 35, 36, and having a conductive contact 41 on the upper portion thereof for electrical engagement with another contact or seat 42 on said housing. A current-carrying spring 43 is interposed between the interior end of the metal terminal 38 and the switch member contact 41 normally urging the follower portion 40 toward positioning engagement with the switch piston land 34.

Referring now also to FIG. 2, a metering or proportioning member or piston, indicated generally at 44, is provided with a head portion 45 integrally formed with a reduced extension or stem portion 46. The head portion 45 is provided with a rightward or free end 47 having a cross groove 48 therein, and a proportioning or metering spring 49 is precompressed between said head portion and a retainer 50 to respectively urge said free end and retainer into abutment with the closure member 17 and the housing shoulder 10, said retainer having an annular extension 51 thereon extending coaxially into the housing counterbore 6 for engagement with the seal 25 to obviate the displacement thereof from the housing counterbore 5 into the housing counterbore 6. An annular peripheral groove 52 is provided in the proportioning pistonhead 45 having a base wall 53 interposed between opposed side walls 54, 55, said side wall 55 defining a valve member for engagement with an annular sealing member 56 which is received in said groove. The sealing member 56 is provided with an annular base portion 57 radially spaced from the groove base wall 53 and interposed between opposed sides 58, 59. The seal side 59 is seated in abutment with the interior end of the closure member 17 and defines a valve seat for engagement with the valve member or groove side wall 55, and an annular peripheral lip 60 is integrally provided in the seal 56 in sealing engagement with the housing counterbore 7. A plurality of return flow passages 60a are radially provided in the seal 56 between the valve seat 59 and the lip 60, and said return flow passages are normally closed by the engagement of said lip with the housing counterbore 7. The proportioning pistonhead 45 is also provided with a plurality of annularly spaced, radially extending guides 61 which are slidably received in the housing counterbore 7, and the proportioning piston extension 46 extends coaxially through said housing counterbore and the retainer 50 into the housing counterbore 6 having a leftward or free end portion 62 slidably received in the switch piston bore 32. The switch and proportioning pistons 26, 44 define another inlet chamber 63 in the housing counterbores 5, 6 and 7 between the centering piston seal 25 and the valve member 56, said inlet chamber being connected in open pressure fluid communication with the inlet port 16 at all times, and the free end 47 of said proportioning piston defines with the closure member 18 an outlet chamber 64 in the closure member recess 20 between the end wall thereof and said valve member, said outlet chamber being connected in open pressure fluid communication with the outlet port 18 at all times and normally being connected in open pressure fluid communication with said inlet chamber through the proportioning piston groove 52. It should be noted that the sealing engagement of the groove sidewall or valve seat 55 with the valve member 56, as discussed hereinafter, defines an effective area $A_4$ on the proportioning piston 44 which is subjected to the fluid pressure at the outlet port 18 at all times, and another effective area $A_5$ is provided on the free end portion 62 of the proportioning piston extension 46 in the switch piston bore 32 and subjected to atmosphere through the damping passage 33 at all times, said area $A_4$ being opposed to and predeterminately greater than the area $A_5$.

The free end portion 62 of the proportioning piston extension 46 is also provided with an annular peripheral groove 65 therein, and peripheral O-ring seals 66, 67 are carried in said free end portion on opposite sides of said groove normally in sealing engagement with the switch piston bore 32 to isolate said groove from the atmosphere prevailing in the damping passage 33 and from the fluid pressure in the inlet chamber 63, respectively. To complete the description of the control valve 1, a passage 68 is provided in the proportioning piston 44 having one end intersecting with the free end 47 of the proportioning piston head 45 and subjected to the fluid pressure at the outlet port 18 at all times while the other end thereof connects with a cross passage 69 which, in turn, intersects with the groove 65; therefore, it is apparent that the passage 68, cross passage 69, groove 65 and the portion of the switch piston bore 32 rightwardly of the proportioning piston seal 66 define a bypass passage, indicated generally at B, for connection in bypass pressure fluid communication between the inlet and outlet ports 16, 18 but normally connected only in pressure fluid communication with the fluid pressure at the outlet port 18 and isolated from the fluid pressure at the inlet port 16.

In the operation with the component parts of the control valve 1 positioned as shown in the drawings and as described hereinabove, separately supplied or input fluid pressures $P_1$, $P_2$ normally having substantially equal magnitudes are supplied upon actuation of a split system master cylinder (not shown) to the inlet ports 15, 16, respectively, of said control valve. The input fluid pressure $P_1$ flows from the inlet port 15 into the inlet chamber 30 acting on the area $A_2$ of the switch piston 26 to establish a force $P_1 A_2$, and the input fluid pressure $P_2$ flows from the inlet port 16 into the inlet chamber 63 acting on the areas $A_1$, $A_3$ of the centering and switch pistons 21, 26 to establish forces $P_2 A_1$, $P_2 A_3$, respectively, which are opposed to the force $P_1 A_2$. Since the area $A_2$ is greater than the area $A_3$ and the fluid pressures $P_1$, $P_2$ are substantially equal, the force $P_1 A_2$ urges the switch piston 26 rightwardly against the force $P_2 A_3$ to drivingly engage the cam surface 36 with the centering piston end 22, but since the additive areas $A_1$, $A_3$ are greater than the area $A_2$, the forces $P_2 A_3$, $P_2 A_1$ are also additive and opposed to the force $P_1 A_2$ thereby preventing the rightward movement of said switch piston from its normal or centered position. The force $P_2 A_1$ urges the centering piston 21 leftwardly to engage the end 22 thereof with the housing shoulder 9; therefore, since the area $A_3$ is less than the area $A_2$, the force $P_2 A_3$ is ineffective to move the switch piston 26 leftwardly from its centered position against the opposing force $P_1 A_2$ when said centering piston is urged into engagement with said housing shoulder by the force $P_2 A_1$. In this manner, the switch piston 26 is normally maintained in its centered position so long as the magnitudes of the supplied fluid pressures $P_1$, $P_2$ are within a predetermined differential.

The input fluid pressure $P_2$ flows from the inlet port 16 into the inlet chamber 63, as previously mentioned, and therefrom through the proportioning piston groove 52 to the outlet chamber 64 to establish an output or applied fluid pressure $P_o$ at the outlet port 18. The input fluid pressure $P_2$ acts on the input effective area $A_4 - A_5$ of the proportioning piston 44 to establish an input force $P_2 (A_4 - A_5)$, and the output fluid pressure $P_o$ acts on the effective area $A_4$ of said proportioning piston to establish an output force $P_o A_4$ opposed to said input force $P_2 (A_4 - A_5)$. Since the input and output fluid pressures $P_2$, $P_o$ are initially equal and since the area $A_4$ is greater than the area $A_4 \pm A_5$ of the proportioning piston, it is obvious that the output force $P_o A_4$ is greater than the input force $P_2 (A_4 - A_5)$; however, the compressive force of the proportioning spring 49 is additive to the input force $P_2 (A_4 - A_5)$; and thereby movement of the proportioning piston 44 is prevented until the input and output fluid pressures $P_2$, $P_o$ exceed a predetermined value R, as shown by the line OR in the graphical representation of FIG. 3. When the predetermined value R of the input and output fluid pressures $P_2$, $P_o$ is attained, the output force $P_o A_4$ overcomes the additive input and spring forces $P_2 (A_4 - A_5)$, $F_c$ to move the proportioning piston 44 leftwardly against the spring 49 from its normal or inoperative position toward a position isolating the input fluid pressure $P_2$ from the output fluid pressure $P_o$ and engaging the valve member 55 with the valve seat 59 of the sealing member 56. When the proportioning piston 44 is in its isolating position with the valve 55 engaged with the valve seat 59, the proportioning piston groove 52 is closed to interrupt pressure fluid communication between the inlet and outlet ports 16, 18, and the rightward free end portion 48 is disengaged from the closure member 17.

From the graph of FIG. 3, it is obvious that the increases in the magnitude of the input fluid pressure $P_2$ in excess of the predetermined value R, as illustrated by the line RS in said graph, will result in proportionally reduced increases in the output fluid pressure $P_o$, as illustrated by the line RT of said graph. For instance, when the input fluid pressure $P_2$ is increased to a value in excess of the predetermined value R, the input force $P_2 (A_4 - A_5)$ is correspondingly increased and additive to the spring force $F_c$ to overcome the output force $P_o A_4$; therefore, the proportioning piston 44 is moved rightwardly from its isolating position toward a metering position disengaging the valve member 55 from the valve seat 59 to effect a metered application of the increased input fluid pressure $P_2$ through the proportioning piston groove or passage 52 into the outlet chamber 63 to effect a proportional or ratioed increase in the output fluid pressure $P_o$ at the outlet port 18, as shown by the line RT in the graph of FIG. 3, wherein $P_o=[P_2(A_4-A_5) + F_c/A_4]$. Of course, the increased output fluid pressure $P_o$ in excess of the predetermined value R effects a corresponding increase in the output force $P_o A_4$, and when the increased output force $P_o A_4$ attains an increased value substantially equal to the increased input force $P_2 (A_4-A_5)$ and the spring force $F_c$, the proportioning piston 44 is again moved leftwardly toward its isolating position to reposition the valve member 55 in lapped engagement with the valve seat 59 and again isolate the increased input and output fluid pressures $P_2$, $P_o$. It is, of course, obvious that the proportioning piston 44 will be responsive to further increases in the input fluid pressure $P_2$ to effect further proportional increases in the output fluid pressure $P_o$ in the same manner as previously described, and it should also be noted that as the input fluid pressure $P_2$ is increased, the separate input fluid pressure $P_1$ is also substantially equally increased which obviates displacement or translatory movement of the switch piston 26 from its centered position.

When the split system master cylinder is deactuated, the input fluid pressures $P_1$, $P_2$ are vented to the atmosphere which eliminates the forces $P_1 A_2$, $P_2 A_3$ acting on the switch piston 26 and the force $P_2 A_1$ acting on the centering piston as well as the input force $P_2 (A_4-A_5)$ acting on the proportioning piston 44. Upon the elimination of the input fluid pressure $P_2$, the output fluid pressure $P_o$ acting on the sealing member 56 displaces the side 59 and lip 60 from sealing engagement with the interior end 19 of the closure member 17 and the housing counterbore 7, respectively, and in this manner, the applied or output fluid pressure $P_o$ returns from the outlet port 18, through the outlet chamber 64 and past the displaced side 59 and lip 60 of the seating member 56 through the return flow passages 60a thereof into the inlet chamber 63 to the inlet port 16. When the output fluid pressure $P_o$ is so reduced to correspondingly reduce the output force $P_o A_4$ to a value less than the metering spring force $F_c$, the metering spring 49 moves the proportioning piston 44 rightwardly toward its original position reengaging the rightward end 48 thereof with the closure member 17 and displacing the valve member 55 from its seat 59 on the sealing member 56 to again open the proportioning piston passage 52 reestablishing open pressure fluid communication therethrough between the inlet and outlet ports 16, 18 to effect complete elimination of the output fluid pressure $P_o$.

In the event of the failure of the input fluid pressure $P_1$ due to a malfunction of the split system master cylinder or other leaks or the like, it is, of course, desirable to obviate the metering or proportioning function or actuation of the proportioning piston 44 and effect the application of an unaltered or unmetered output fluid pressure to the outlet port 18 in order to utilize the maximum available fluid pressure for energizing the vehicle brake set connected with said outlet port under such emergency conditions; therefore, when the magnitude of the input fluid pressure $P_2$ exceeds that of the failed input fluid pressure $P_1$ by a predetermined value, the force $P_2 A_3$ acting on the switch piston 26 will displace said switch piston leftwardly toward a displaced or translated position in the housing 2 and relative to the proportioning piston 44. This leftward translatory movement of the switch piston 26 disengages the bore 32 thereof from sealing engagement with the seal 67 on the proportioning piston 44 to permit the bypass flow of the input fluid pressure $P_1$ from the inlet port 16 through the inlet chamber 63, the portion of the switch piston bore 30 disengaged from the proportioning piston seal 67, the proportioning piston groove and passages 65, 68, 69 to the outlet chamber 64 and outlet port 18 in bypass relation with the proportioning piston 44 to obviate metering actuation thereof, and it is, of course, obvious that the input and output fluid pressures $P_2$, $P_o$ are equal when the bypass passage B is opened to effect the application of the maximum available fluid pressure to the vehicle brake set connected with said outlet port under the emergency condition. Further, the leftward translatory movement of the switch piston 26 also displaces the land 34 from engagement with the switch member follower end 40, and the switch spring 43 displaces said follower end into the housing counterbore 4 to effect the engagement of the switch contact 40 with the housing contact 41 thereby completing the electrical circuit for energizing the driver warning dash lamp (not shown).

The control valve 1 functions in substantially the same manner to complete the electrical circuit and energize the driver warning dash lamp in the event of the alternative failure of the input fluid pressure $P_2$ wherein the force of the input fluid pressure $P_1$ acting on the area $A_2$ of the switch piston 26 effects the rightward translatory movement thereof. During the rightward translatory movement of the switch piston 26, the land 34 is again displaced from engagement with the switch member follower end 40, and the switch spring 43 displaces said follower end downwardly into the housing counterbore 4 to effect the engagement of the switch contact 40 with the housing contact 41 to complete the electrical circuit and energize the driver warning lamp.

From the foregoing, it is is now apparent that a novel control valve 1 meeting the objects set out hereinbefore, as well as other objects and advantageous features, is provided and that changes or modifications as to the precise configurations, shapes and details of the construction set forth in the disclosure by way of illustration may be made by those skilled in the art without departing from the spirit of the invention.

The embodiments of the invention in which I claim an exclusive property or privilege are defined as follows:

1. A control valve comprising a housing, means for comparing the magnitudes of separate fluid pressures supplied to said housing and movable therein from a normally centered position toward opposed translated positions in response to oppositely acting differentials in excess of a predetermined amount between the magnitudes of the separately supplied fluid pressures acting thereon, metering means movable in said housing in response to one of the supplied fluid pressures to effect a metered application thereof through said housing, means in said first-named means and metering means respectively defining bypass passage means for subjection to the one supplied fluid pressure and connected in bypass relation with said metering means, said bypass passage means being subjected to the one supplied fluid pressure to bypass said metering means and obviate the metering actuation thereof upon the movement of said first-named means toward one of its translated positions when the magnitude of the one supplied fluid pressure exceeds that of the other of the supplied fluid pressures by the predetermined amount, and other means movable in said housing for engagement with said housing and said first named means and subjected to one of the one and other supplied fluid pressures, said other means being urged in response to the one of the one and other supplied fluid pressures acting thereon toward engagement with said housing and with said first-named means to oppose movement of said first-named means toward one of its one translated position and the other of its translated positions.

2. A control valve according to claim 1, wherein said metering means includes a portion engaged with said first-named means to normally close said bypass passage means, said bypass passage means being opened and subjected to the one supplied fluid pressure upon the movement of said first-named means toward its one translated position relative to said portion.

3. A control valve according to claim 1, comprising means on one of said first-named means and metering means defining valve means normally engaged with the other of said first named means and metering means to isolate said bypass passage means from said one supplied fluid pressure, said valve means being disengaged from said other of said first-named means and metering means to open said bypass passage means and subject said bypass passage means to the one supplied fluid pressure upon the movement of said first named means toward its one translated position.

4. A control valve according to claim 1, comprising opposed effective areas on said first-named means respectively subjected to the one supplied fluid pressure and the other of the supplied fluid pressures, said first-named means being movable toward its one translated position when the differential between the magnitude of the one supplied fluid pressure acting on one of said opposed areas exceeds that of the other supplied fluid pressure acting on the other of said opposed areas by the predetermined amount.

5. A control valve according to claim 4, wherein said other opposed area is predeterminately greater than said one opposed area, a third area on said other means subjected to the one fluid pressure and additive to said one opposed area, the sum of said one opposed area and said third area being greater than said other opposed area, said other means being normally urged in response to the one supplied fluid pressure acting on said third area toward engagement with said housing and with said first named means to oppose movement of said first named means from its centered position toward its one translated position in response to the other supplied fluid pressure acting on said other opposed area in opposition to the one supplied fluid pressure acting on said one opposed area.

6. A control valve comprising a housing, means for comparing the magnitudes of separate fluid pressures supplied to said housing and movable therein from a normally centered position toward opposed translated positions in response to oppositely acting differentials in excess of a predetermined amount between the magnitudes of the separately supplied fluid pressures acting thereon, metering means movable in said housing in response to one of the supplied fluid pressures to effect a metered application thereof through said housing, means in said first named means and metering means respectively defining bypass passage means for subjection to the one supplied fluid pressure and connected in bypass relation with said metering means, said bypass passage means being subjected to the one supplied fluid pressure to bypass said metering means and obviate the metering actuation thereof upon the movement of said first-named means toward one of its translated positions when the magnitude of the one supplied fluid pressure exceeds that of the other of the supplied fluid pressures by the predetermined amount, and sealing means normally engaged between said first-named means and said metering means to close said bypass passage means, said sealing means being disengaged from one of said first-named means and said metering means upon the movement of said first-named means to its one translated position to open said bypass passage means and subject it to the one supplied fluid pressure.

7. A control valve comprising a housing, means for comparing the magnitudes of separate fluid pressures supplied to said housing and movable therein from a normally centered position toward opposed translated positions in response to oppositely acting differentials in excess of a predetermined amount between the magnitudes of the separately supplied fluid pressures acting thereon, metering means movable in said housing for controlling the application of one of the supplied fluid pressures through said housing, a bore in said first-named means for subjection to the one supplied fluid pressure, said metering means being slidable in said bore, passage means in said metering means connected in bypass relation therewith having one end in open pressure fluid communication with the applied fluid pressure and the other end thereof in pressure fluid pressure and the other end thereof in pressure fluid communication with said bore, and sealing means engaged between said bore and said metering means when said first named means is in its centered position to normally isolate the other end of said bypass passage means from the one supplied fluid pressure, said sealing means being disengaged from one of said bore and said metering means to subject the other end of said bypass passage means to the one supplied fluid pressure and bypass said metering means to obviate metering actuation thereof upon the movement of said first named means toward one of its translated positions when the magnitude of the one supplied fluid pressure exceeds that of the other of the supplied fluid pressures by the predetermined amount.

8. A control valve according to claim 7, comprising first and second opposed areas on said first-named means for respective subjection to the one and other supplied fluid pressures, said first named means being movable toward its one translated position when the differential between the magnitude of the one supplied fluid pressure acting on said first area exceeds that of the other supplied fluid pressure acting on said second area by the predetermined amount.

9. A control valve according to claim 8, wherein said second area is predeterminately greater than said first area, a pair of abutment means on said housing and said first named means, respectively, other means movable in said housing for engagement with said abutment means, and a third area on said other means for subjection to the one supplied fluid pressure and additive to said first area, the sum of said first and third areas being at least as great as said second area, said other means being normally urged in response to the one supplied fluid pressure acting on said third area into abutting engagement with said abutment means to oppose movement of said first-named means from its centered position toward one of its one translated positions and the other of its translated positions in response to the other supplied fluid pressure acting on said second area in opposition to the one supplied fluid pressure acting on said first area.

10. A control valve according to claim 7, comprising a pair of opposed differential areas on said metering means respectively subjected to the one supplied fluid pressure and the applied fluid pressure, said metering means being initially movable in response to the one supplied fluid pressure and applied fluid pressures of a predetermined value respectively acting on said differential areas toward a position in said housing isolating the one supplied fluid pressure from the applied fluid pressure and being thereafter further movable in response to increases in the one supplied fluid pressure acting on one of said differential areas toward a metering position to effect a metered increase in the applied fluid pressure acting on the other of said differential areas in a predetermined ratio with the increased one supplied fluid pressure in excess of the predetermined value.

11. A control valve comprising a housing having a pair of inlet chambers and an outlet chamber, means movable in said housing between said inlet chambers from a normally centered position toward opposed translated positions in response to oppositely acting differentials in excess of a predetermined amount between the magnitudes of the fluid pressures in said inlet chambers acting thereon, metering means movable in said housing between one of said inlet chambers and said outlet chamber for controlling pressure fluid communication therebetween, said metering means being movable in response to the fluid pressure in said one inlet chamber in excess of a predetermined value toward a metering position in said housing establishing metered pressure fluid communication between said one inlet chamber and said outlet chamber to effect a metered increase in the fluid pressure in said outlet chamber in a predetermined ratio with the fluid pressure in said inlet chamber in excess of the predetermined value, bypass passage means in said first named and metering means connected with the fluid pressure in said outlet chamber in bypass relation with said metering means and including a chamber in one of said first named and metering means, and sealing means normally engaged between said first named and metering means to isolate said included chamber from the fluid pressure in said one inlet chamber, said sealing means being disengaged from one of said first named and metering means to subject said included chamber to the fluid pressure in said one inlet chamber to bypass said metering means and obviate the metering actuation thereof upon the movement of said first-named means toward one of its translated positions when the magnitude of the fluid pressure in one of said one and other inlet chambers exceeds that of the fluid pressure in the other of said one and other inlet chambers by the predetermined amount.

12. A control valve comprising a housing having three ports therein, means movable in said housing for comparing the magnitudes of the fluid pressures at two of said ports metering means movable in said housing and operable generally in response to the fluid pressures at one of said two ports to establish a metered fluid pressure at said third port upon preselected conditions, passage means in said first named and metering means for connecting said one of said two ports and said third port in open pressure fluid communication to obviate the metering actuation of said metering means, and sealing means engaged between said first-named and metering means normally isolating said passage means from the fluid pressure at said one of said two ports, said sealing means being disengaged from one of said first-named and metering means to connect said passage means in open pressure fluid communication between said one of said two ports and said third port upon the movement of said first named means relative to said metering means toward a translated position in said housing when the fluid pressure at said one of said two ports exceeds that at the other of said two ports by a predetermined amount.

13. A control valve comprising a housing having three ports therein, means for comparing the magnitudes of the fluid pressures at two of said ports and movable in said housing between said two ports from a normally centered position toward opposed translated positions in response to oppositely directed differentials in excess of a predetermined amount between the fluid pressures at said two ports respectively acting thereon, metering means movable in said housing for controlling pressure fluid communication between one of said two ports and said third port, said metering means being initially movable in response to the fluid pressures at said one of said two ports and said third port of a predetermined value toward a position interrupting pressure fluid communication therebetween and being thereafter further movable in response to increases in the fluid pressure at said one of said two ports in excess of the predetermined value toward a position establishing metered pressure fluid communication between said one of said two ports and said third port to effect a metered increase in the fluid pressure at said third port in a predetermined ratio with the increased fluid pressure at said one of said two ports in excess of the predetermined value, a bore in said first-named means for subjection to the fluid pressure at said one of said two ports, said metering means being slidable in said bore, passage means in said metering means for connection in bypass relation therewith between said one of said two ports and said third port, said passage means having one end connected in open pressure fluid communication with the fluid pressure at said third port and the other end thereof in said bore, and seal means engaged between said bore and said metering means interrupting pressure fluid communication between said one of said two ports and said passage means when said first named means is in its centered position, said seal means being disengaged from one of said bore and said metering means to establish bypass pressure fluid communication between said one of said two ports and said third port through said passage means and obviate metering actuation of said metering means upon the movement of said first-named means toward one of its translated positions when the magnitude of the fluid pressure at said one of said two ports exceeds that at the other of said two ports by the predetermined value.

14. A control valve according to claim 13, comprising opposed end portions on said metering means, one of said end portions being subjected to the fluid pressure at said third port and the other of said end portions being slidable in said bore, peripheral groove means on said one end portion and communicating with said bore, said one end of said passage means intersecting with said one end portion and said other end of said passage means intersecting with said groove means, and said seal means defining a peripheral seal on said one end portion and normally engaged with said bore between said groove means and said one of said two ports, said bore being displaced from engagement with said peripheral seal upon the movement of said first named means to its one translated position.

15. A control valve comprising a housing having first and second inlet ports and an outlet port therein, a switch-operating piston movable in said housing between said first and second inlet ports from a normally centered position toward opposed translated positions including first and second opposed end portions, first and second opposed areas on said first and second end portions respectively subjected to the fluid pressures at said first and second inlet ports, said first area being predeterminately greater than said second area, and a first bore in said second end portion for pressure fluid communication with the fluid pressure at said second inlet port, first and second abutments on said housing and said switch-operating piston, centering piston means movable in said housing including a third end portion for engagement with said first and second abutments, a fourth end portion opposed to said third end portion and defining a third area subjected to the fluid pressure at said second inlet port and additive to said second area, the sum of said second and third areas being at least as great as said first area, and a second bore intersecting said third and fourth end portions, said second end portion being slidable in said second bore, the fluid pressure at said second port acting on said third area to urge said third end portion into engagement with said first and second abutments and normally maintain said switch-operating piston in its centered position against the fluid pressure at said first inlet port acting on said first area in opposition to the fluid pressure at said second inlet port acting on said second area, a proportioning piston movable in said housing for controlling pressure fluid communication between said second inlet port and said outlet port, resilient means normally urging said proportioning piston toward a position in said housing establishing open pressure fluid communication between said second inlet port and outlet port, fourth and fifth opposed areas on said proportioning piston for respective subjection to the fluid pressures at said second inlet port and said outlet port, said proportioning piston being initially movable against the force of said resilient means in response to the fluid pressures of a predetermined value at said second inlet port and outlet port respectively acting on said fourth and fifth areas toward a position in said housing interrupting pressure fluid communication between said second inlet port and outlet port and being thereafter further movable in response to increases in the fluid pressure at said second inlet port in excess of the predetermined value acting on said fourth area and assisted by the force of said resilient means toward a metering position to establish metered pressure fluid communication between said second inlet port and said outlet port and effect a metered increased in the fluid pressure at said outlet port acting on said fifth area in a predetermined ratio with the increased fluid pressure at said second inlet port in excess of the predetermined value, extension means on said proportioning piston slidable in said first bore, a bypass passage in said proportioning piston for connection in bypass relation therewith between said second inlet port and said outlet port, said bypass passage having one end connected in open pressure fluid communication with the fluid pressure at said outlet port and the other end thereof in said first bore, and seal means engaged between said first bore and said extension means interrupting pressure fluid communication between said second inlet port and said bypass passage through said first bore when said switch operating piston is in its centered position, said seal means being disengaged from one of said first bore and said extension means to establish bypass pressure fluid communication between said second inlet port and said outlet port through said bypass passage and obviate the metering actuation of said proportioning piston upon the movement of said switch piston to one of its translated positions when the magnitude of the fluid pressure at said second inlet port acting on said second area exceeds that of the fluid pressure at said first inlet port acting on said first area by the predetermined amount.

UNITED STATES PATENT OFFICE

CERTIFICATE OF CORRECTION

Patent No. 3,597,008            Issued August 3, 1971

Edward J. Falk

It is certified that error appears in the above-identified patent and that said Letters Patent are hereby corrected as shown below:

Column 2, line 49, "22" should read -- 21 --.

Column 4, line 40, "$A_4 \pm A_5$" should read -- $A_4 - A_5$ --; line 43, delete the semi-colon (;). Column 5, lines 4 and 5, delete "Po = $[P_2 (A_4 - A_5) + Fc/A_4]$" and insert -- $Po = \frac{P_2 (A_4 - A_5) + Fc}{A_4}$ --. Column 7, line 64, including "fluid" delete down to and including "pressure", third occurrence, in the same line. Column 9, line 3, after "ports" insert a comma -- , --.

Signed and sealed this 13th day of March 1973.

(SEAL)
Attest:

EDWARD M. FLETCHER, JR.            ROBERT GOTTSCHALK
Attesting Officer                 Commissioner of Patents